A. HALLNER.
LOAD INDICATOR.
APPLICATION FILED APR. 7, 1919.
1,350,498.
Patented Aug. 24, 1920.
2 SHEETS—SHEET 2.
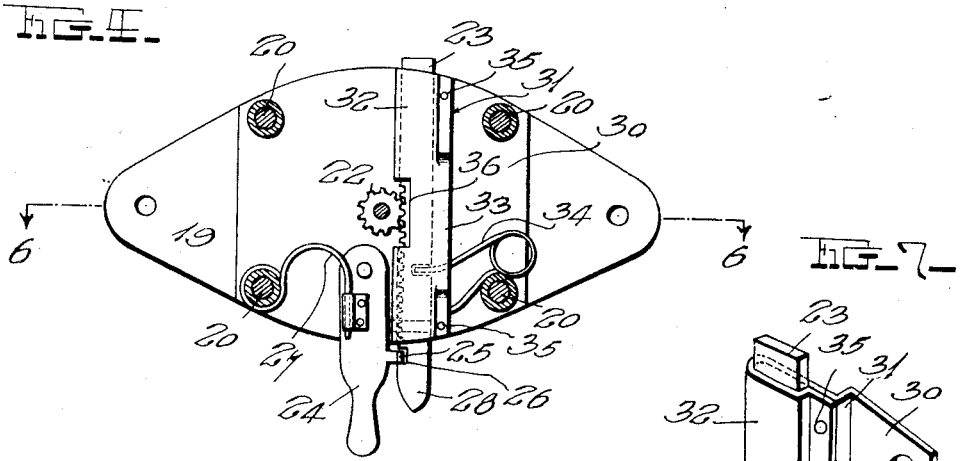
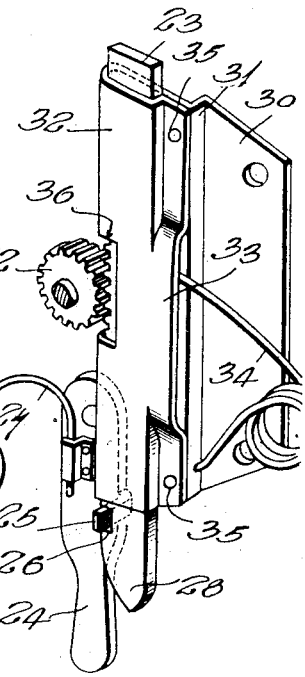
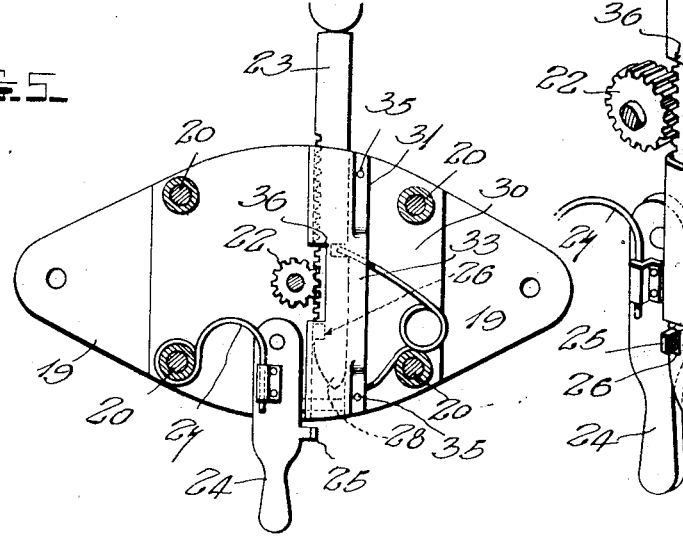
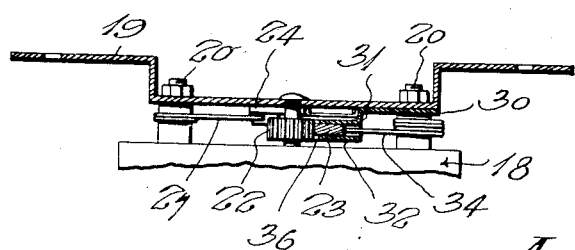
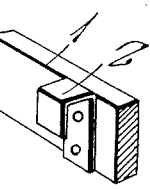
Inventor
A. Hallner

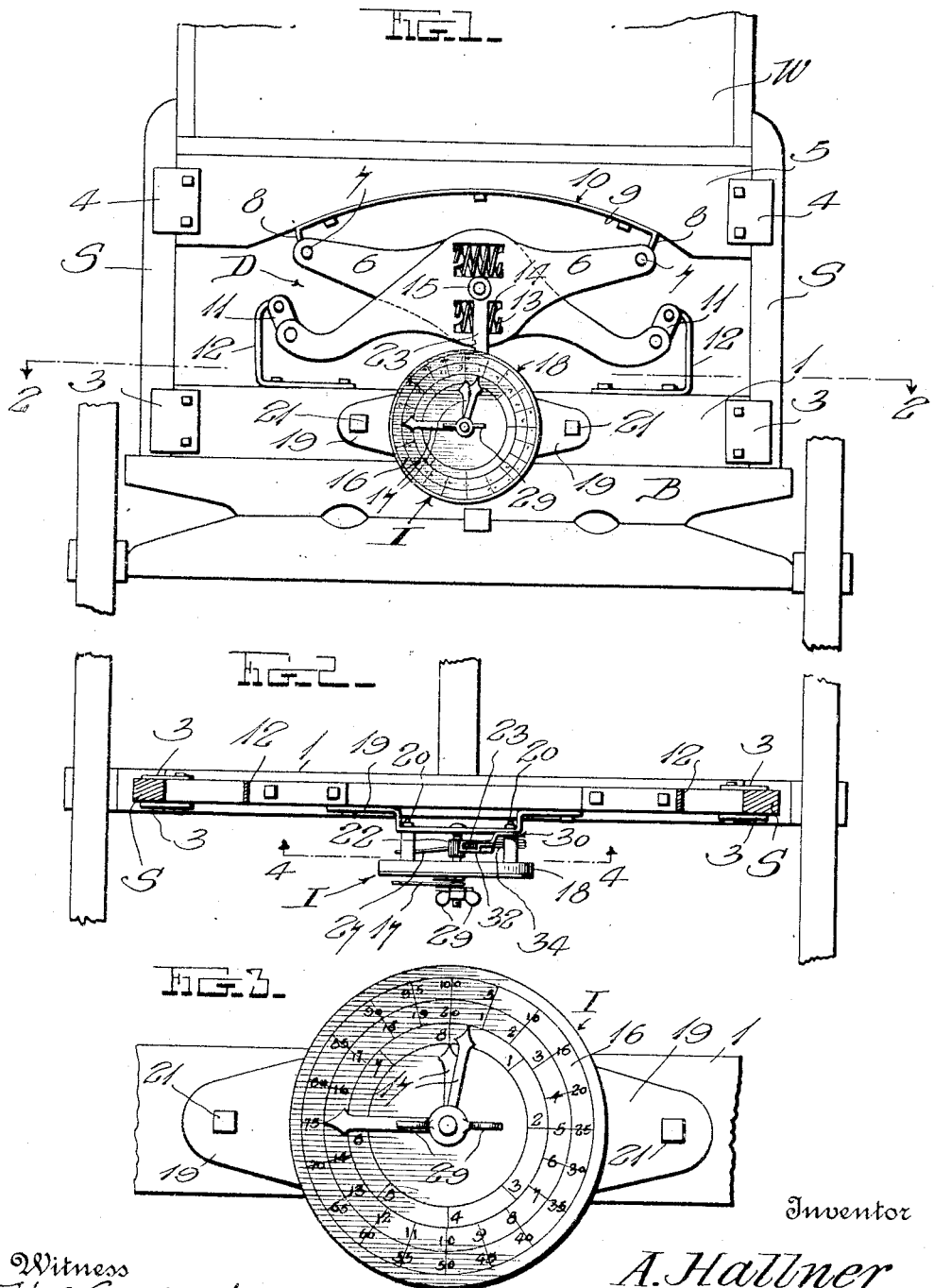

UNITED STATES PATENT OFFICE.

ANDREW HALLNER, OF ARBOGA, CALIFORNIA.

LOAD-INDICATOR.

1,350,498.  Specification of Letters Patent.  Patented Aug. 24, 1920.

Application filed April 7, 1919. Serial No. 288,110.

*To all whom it may concern:*

Be it known that I, ANDREW HALLNER, citizen of the United States, residing at Arboga, in the county of Yuba and State of California, have invented certain new and useful Improvements in Load-Indicators; and I do declare the following to be a full, clear, and exact description of the invention, such as will enable others skilled in the art to which it appertains to make and use the same.

My invention has for its principal object to provide highly efficient means for indicating the weight carried by wagons or other vehicles, so that the farmer for instance will know in advance the weight of the load which he is taking to market.

A further object is to provide a device of the character described which may be quickly and easily attached to farm wagons and the like of usual construction.

Still further objects are to provide means to hold the indicating mechanism against operation when hauling the load, and to provide simple and efficient means for guiding the operating member of the indicator.

With the foregoing in view, the invention resides in the novel features of construction and unique combinations of parts hereinafter fully described and claimed, the descriptive matter being supplemented by the accompanying drawings which form a part of this application.

Figure 1 is a rear elevation of a farm wagon showing the invention applied thereto.

Fig. 2 is a horizontal section on the plane indicated by the line 2—2 of Fig. 1.

Fig. 3 is an enlarged elevation of the indicating dial and the coacting pointers.

Fig. 4 is a vertical section on the plane designated by the line 4—4 of Fig. 2 showing more particularly the guiding means and latch for the operating member of the indicator, said latch being shown in the act of holding said operating member in inoperative position.

Fig. 5 is a duplicate of Fig. 4 with the exception that the operating member is in position for actuation.

Fig. 6 is a horizontal section on the plane of the line 6—6 of Fig. 4.

Fig. 7 is a perspective view of the operating member, its guiding means, and associated parts.

Fig. 8 is a sectional perspective view showing a different manner of mounting the device upon a wagon bolster.

In the drawings above briefly described, the numeral 1 designates a sleeper adapted to be supported by a bolster B of an ordinary farm-wagon, and said sleeper may either rest upon the bolster B as seen in Fig. 1, or may be suspended from the bolster by hooks such as that indicated at 2 in Fig. 8. When the arrangement shown in Fig. 1 is employed, plates or the like 3 are secured to the ends of the sleeper 1 to straddle the usual bolster stakes S as depicted in Fig. 2. Spaced above the sleeper 1 and provided with guides 4 to slide on the stakes S, is a bolster 5, adapted to support the wagon bed W. A spring device D is interposed between the sleeper 1 and the bolster 5, an indicator I is mounted on the sleeper 1, and means are provided for operating the latter from the former, as will be hereinafter specifically described.

The spring device D consists of crossed levers 6 which may be connected at their upper ends to the bolster 5 in any preferred manner. For illustrative purposes, however, I have shown them pivoted at 7 to the downturned ends 8 of a metal bar 9; and the lower edge of the bolster 5 may well be cut out to receive said bar as shown at 10. The lower ends of the levers 6 are shown connected by links 11 to brackets 12 rising from the sleeper 1, but it will be obvious that any adequate arrangement could here also be provided. Coil springs 13 are located in openings 14 formed in the crossed portions of the levers 6 and thus control the relative movement of such levers. By this arrangement, an efficient device is provided for yieldably supporting the load and at the same time, such device forms part of the means for weighing such load, since it operates the indicator I. One of the levers 6 is provided with a central, laterally extending hub 15 for this purpose.

The indicator I includes a dial 16 and three pointers 17, said dial 16 having three scales thereon representing tons, centals and pounds, and the three pointers coöperate respectively with said scales to indicate the exact weight of the load in tons, centals, and pounds. The specific means for operating the pointers 17 forms no part of my invention and is not therefore illustrated in detail, but may be of any suitable construction, located for instance in a casing such as that illustrated at 18. The casing 18 is shown spaced outwardly from the attaching plate 19 and secured to the latter by bolts 20. The plate 19 may well be outwardly offset at its intermediate portion as seen in Figs. 2 and 6 and its ends are secured by bolts or the like 21 to the sleeper 1. An operating pinion 22 is shown for the indicator I and this pinion is actuated by an operating member in the form of a vertical rack bar 23, the teeth of said pinion and bar meshing in the usual way. When the device is in operation, the bar 23 contacts with the hub 15 as seen in Fig. 1 and thus all compression of the spring device D as the wagon is loaded, will correspondingly depress the bar 23 to operate the indicating means, thus showing the exact load.

After loading it would be inadvisable to allow the hub 15 to remain in contact with the bar 23, since in hauling the load, the indicating means would be roughly operated and probably damaged. I therefore provide a latch 24 pivoted to the plate 19 and having a lateral finger 25 for reception in a notch 26 in said bar 23. The latch 24 is spring pressed at 27 and the lower end 28 of the bar 23 is beveled and it will thus be seen that when said bar is depressed to a suitable extent, the latch 24 will be engaged with the notch 26. For so depressing the bar 23, the pinion 22 may well be turned by means of wings or the like 29.

The bar 23 could well be mounted in any preferred manner, but I have shown a novel arrangement for this purpose. A plate 30 is secured to the attaching plate 19 and has substantially half of its width offset outwardly from the latter at 31, such half being folded substantially upon itself to provide an elongated guide 32 for the bar 23. The intermediate portion 33 of the folded part of the plate 30 is spaced from the body portion of said plate to accommodate a spring arm 34 which exerts an upward stress on the bar 23, while above and below said portion 33, the folded part of the plate is secured by rivets or the like 35 to the body of said plate. The offset 31 is provided in order that the latch 24 may operate between the guide 32 and the plate 19 as will be clear from Figs. 6 and 7. The folded edge of the guide 32 is provided with a notch 36 allowing the pinion 22 to mesh with the teeth of the bar 23.

When the device stands as seen in Fig. 1, with the hub 15 resting on the bar 23, any load placed in the wagon bed will be registered by the pointers 17, and after loading, the wings or the like 29 may be operated to lower said bar 23 below the point to which it is moved by maximum load, at which position the latch 24 will retain said bar until released. Operation of the indicator and probable damage thereto is thus prevented as the load is being hauled in the wagon. When the destination is reached, the latch 25 may be released, allowing bar 23 to again abut the hub 15, thus showing, for instance to a prospective purchaser, the exact weight of the load.

When constructed substantially as shown and described, the device may be easily applied to wagons of the usual construction without making any alterations whatever therein, but it will be understood that the exact manner shown for applying the invention to the wagon need not be strictly followed; that the device may be used in connection with all forms of vehicles, and that numerous minor changes may be made within the scope of the invention as claimed.

It may be added that due to the form of spring device used, that is, the crossed levers and spring means for controlling their movement, the action of the indicator will be the same regardless of the transverse position of the load in the wagon bed, since one-half of the bed cannot depress without the other half.

I claim:

1. A load weighing device for vehicles comprising a spring device for disposition between the vehicle body and the running gear, a load indicator adapted to be fixedly carried by the running gear and having a downwardly movable spring-raised operating member depressed by compression of said spring device, and means for holding said operating member in a position against the tension of its spring raising means to prevent actuation of said member while hauling the load.

2. A load weighing device for vehicles comprising a spring device for disposition between the vehicle body and the running gear, a load indicator adapted to be fixedly carried by the running gear and having a downwardly movable operating member, a projection extending from said spring device for depressing said operating member when said spring device is compressed by the load, and means for holding said operating member in a position below the point to which it is depressed by maximum load, whereby to prevent actuation of said member while hauling the load.

3. A load weighing device for vehicles comprising crossed levers centrally pivoted together at their crossing point, means for connecting the ends of said levers with a vehicle running gear and body, and spring means for controlling the movement of said levers and consequently the depression of the vehicle body; together with a load indicator adapted to be fixedly mounted on the running gear, said indicator having an operating member, and means at the central pivot point of said levers for actuating said operating member.

4. A load weighing device for vehicles comprising crossed levers, means for connecting the ends of said levers with a vehicle running gear and body, and spring means for controlling the movement of said levers and consequently the depression of the vehicle body; together with a load indicator adapted to be fixedly mounted on the running gear, said indicator having a depressible operating member, and a hub extending laterally from one of said levers for depressing said operating members.

5. A load weighing device comprising a sleeper adapted to be supported by a wagon running gear, a bolster above said sleeper adapted to support the wagon bed, crossed levers extending between and attached to said bolster and sleeper, spring means for controlling the movement of said levers, a load indicator mounted on said sleeper, and mean for operating said indicator from said levers as the latter are moved by the weight of the load.

6. In an indicator of the class described, a plate adapted for attachment to a support, one edge portion of said plate being folded substantially upon itself to provide an elongated guide, the edge of the folded portion of said plate being spaced from the body of the plate between the ends of the guide to form a slot, and being secured to said body at the ends of the guide, a rack bar slidable in said guide, an indicator fixed with respect to said plate and having an operating pinion meshing with said rack bar, and a spring for resisting the movement of said rack bar, said spring being secured to said plate and passing through said slot to said rack bar.

In testimony whereof I have hereunto set my hand.

ANDREW HALLNER.